United States Patent
Hayama

(10) Patent No.: US 9,853,910 B2
(45) Date of Patent: Dec. 26, 2017

(54) CONTENTS REPRODUCTION APPARATUS

(71) Applicant: MITSUBISHI ELECTRIC CORPORATION, Tokyo (JP)

(72) Inventor: Michiya Hayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/114,358

(22) PCT Filed: Feb. 4, 2015

(86) PCT No.: PCT/JP2015/053075
§ 371 (c)(1),
(2) Date: Jul. 26, 2016

(87) PCT Pub. No.: WO2015/119141
PCT Pub. Date: Aug. 13, 2015

(65) Prior Publication Data
US 2017/0019346 A1  Jan. 19, 2017

(30) Foreign Application Priority Data
Feb. 4, 2014  (JP) .................... 2014-019674

(51) Int. Cl.
*H04L 12/925*  (2013.01)
*G01C 21/36*  (2006.01)
(Continued)

(52) U.S. Cl.
CPC ............ *H04L 47/722* (2013.01); *G01C 21/36* (2013.01); *G01C 21/3629* (2013.01);
(Continued)

(58) Field of Classification Search
CPC ..... G01C 21/3629; G01C 21/36; H04L 13/08; H04L 47/722; H04L 67/12; H04L 67/18; H04N 21/41422; H04N 21/44004; H04N 21/44209
USPC ......................................... 709/219
See application file for complete search history.

(56) References Cited

U.S. PATENT DOCUMENTS

| 8,009,633 B2 * | 8/2011 | Tahara | G01C 21/26 370/235 |
| 8,352,989 B2 * | 1/2013 | Mori | H04W 28/22 370/338 |

(Continued)

FOREIGN PATENT DOCUMENTS

| JP | 2000-261731 A | 9/2000 |
| JP | 2004-214902 A | 7/2004 |

(Continued)

*Primary Examiner* — Michael C Lai
(74) *Attorney, Agent, or Firm* — Birch, Stewart, Kolasch & Birch, LLP

(57) ABSTRACT

A contents reproduction apparatus has a contents buffer, a contents reproduction unit, a navigation function unit that provides guide in a route to a destination, an output switching unit that selects first audio data outputted from the contents reproduction unit or second audio data outputted from the navigation function unit and outputs the selected audio data to outside, and a streaming control unit that sets a buffer size that is a target value of the data amount of contents data to be accumulated in the contents buffer and controls the contents reproduction unit and the output switching unit. When the data amount of contents data accumulated in the contents buffer is less than the buffer size, a reproduction operation of the contents reproduction unit is stopped in a period in which the second audio data are outputted to outside.

9 Claims, 10 Drawing Sheets

(51) Int. Cl.
*H04L 29/08* (2006.01)
*H04L 13/08* (2006.01)
*H04N 21/414* (2011.01)
*H04N 21/44* (2011.01)
*H04N 21/442* (2011.01)

(52) U.S. Cl.
CPC .............. *H04L 13/08* (2013.01); *H04L 67/12* (2013.01); *H04L 67/18* (2013.01); *H04N 21/41422* (2013.01); *H04N 21/44004* (2013.01); *H04N 21/44209* (2013.01)

(56) References Cited

U.S. PATENT DOCUMENTS

| | | |
|---|---|---|
| 2006/0128370 A1 | 6/2006 | Tahara |
| 2007/0032975 A1 | 2/2007 | Mori et al. |
| 2009/0125227 A1* | 5/2009 | Wistrand ........... G01C 21/3629 701/532 |

FOREIGN PATENT DOCUMENTS

| | | |
|---|---|---|
| JP | 2005-79909 A | 3/2005 |
| JP | 2006-173973 A | 3/2005 |
| JP | 2005-151352 A | 6/2005 |
| JP | 2005-295111 A | 10/2005 |
| JP | 2007-311902 A | 11/2007 |
| JP | 2011-120124 A | 6/2011 |

* cited by examiner

CONTENTS REPRODUCTION APPARATUS

FIELD

The present invention relates to a contents reproduction apparatus that reproduces streaming contents in a movable object such as a vehicle.

BACKGROUND

When streaming contents are to be viewed using a communication terminal curried in a movable object such as a vehicle, deterioration of images, sound dropout or the like occurs due to deterioration of communication quality (decrease or delay in the communication speed, or data loss). As a method for preventing deterioration of contents in a mobile communication terminal, there have been proposed a method of increasing a buffer size on a contents reproduction side, a method of decreasing a communication data amount by decreasing a bit rate of contents, and the like (see Patent Literatures 1 to 4 listed below, for example).

In the inventions described in Patent Literatures 1 and 2, start and end times of a communication-interrupted section and communication quality on a route are predicted based on vehicle information (road information, speed, running route and the like) to change the bit rate and the buffer, thereby preventing deterioration of the contents. In the invention described in Patent Literature 3, an optimum communication bit rate is calculated by an apparatus that mediates contents between a streaming-contents reproduction apparatus mounted on a vehicle and a contents server, and is notified to the streaming-contents reproduction apparatus, thereby improving deterioration of contents caused by deterioration of communication quality. Further, in the invention described in Patent Literature 4, by controlling the reproduction speed based on a remaining amount of the buffer at the time of reproduction of contents, discontinuity of contents reproduction caused by decrease in communication quality is improved. In the method described above, contents discontinuity associated with change of the buffer size does not occur.

CITATION LIST

Patent Literatures

Patent Literature 1: Japanese Patent Application Laid-open No. 2005-151352
Patent Literature 2: Japanese Patent Application Laid-open No. 2011-120124
Patent Literature 3: Japanese Patent Application Laid-open No. 2005-79909
Patent Literature 4: Japanese Patent Application Laid-open No. 2004-214902

SUMMARY

Technical Problem

In the inventions described in Patent Literatures 1 to 3, deterioration of contents is prevented by changing the bit rate and the buffer size based on the vehicle information (road information, speed, running route and the like) and the predicted communication quality. However, when the bit rate is changed, the contents server side needs to adapt to different reproduction bit rates. Further, when the buffer size is increased during reproduction of the contents, discontinuity of contents reproduction may occur.

In the invention described in Patent Literature 4, deterioration of the contents associated with a decrease in the communication quality is prevented by changing the reproduction speed. However, there are problems including adverse change in pitch of sound during the reproduction, and the like. While a technique of changing the reproduction speed without changing the pitch of sound has been proposed, an arithmetic device for audio waveforms is required.

The present invention has been achieved in view of the above circumstances, and its object is to provide a contents reproduction apparatus that can change a buffer size while avoiding discontinuity of contents reproduction.

Solution to Problem

In order to solve the above-mentioned problems and achieve the object, the present invention provides a contents reproduction apparatus that is mounted on a movable object and reproduces contents data streamed by wireless transmission, the contents reproduction apparatus comprising: a contents-data accumulation unit to accumulate the contents data; a contents reproduction unit to reproduce the contents data; a navigation unit to provide guide in a route to a destination of the movable object; an output audio-data selection unit to select first audio data outputted from the contents reproduction unit or second audio data outputted from the navigation unit to output the selected audio data to outside; a buffer-size setting unit to set a buffer size, that is a target value of a data amount of contents data to be accumulated in the contents-data accumulation unit, in the contents-data accumulation unit, based on information about the route and a moving speed of the movable object; and a control unit to control the contents reproduction unit and the output audio-data selection unit, wherein when an amount of contents data accumulated in the contents-data accumulation unit is less than the buffer size, the control unit stops a reproduction operation of the contents reproduction unit in a period in which the second audio data are outputted to outside.

Advantageous Effects of Invention

According to the present invention, it is possible to realize a contents reproduction apparatus that can avoid interruption of contents reproduction caused by a buffering process from being recognized by a user.

DESCRIPTION OF EMBODIMENTS

Embodiments of a contents reproduction apparatus according to the present invention will be described below in detail with reference to the drawings. It should be noted that the present invention is not limited to these embodiments.

First Embodiment

Figure 1:
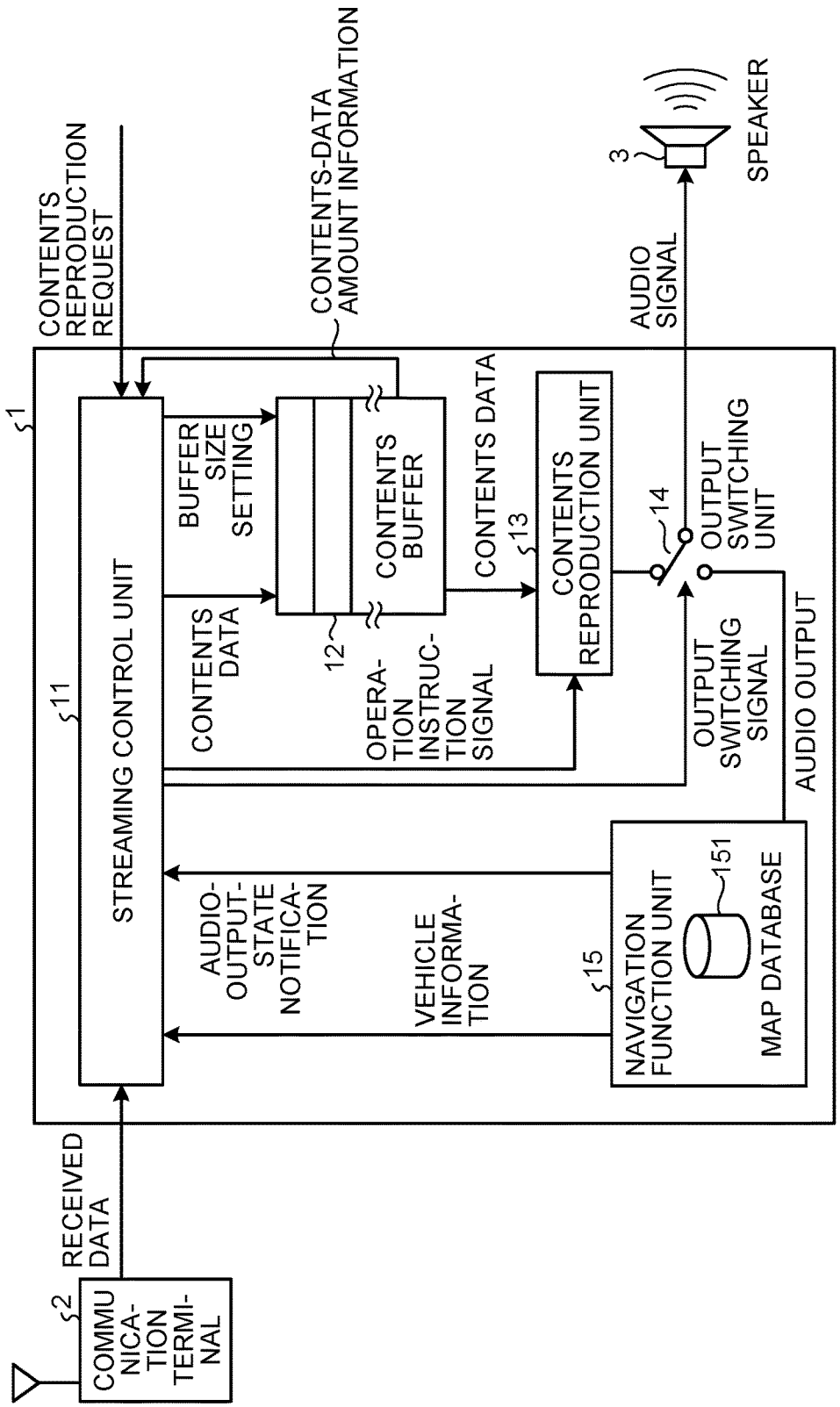
FIG. 1 is a diagram illustrating a configuration example of a contents reproduction apparatus according to a first embodiment of the present invention.

FIG. 1 is a diagram illustrating a configuration example of a contents reproduction apparatus according to a first embodiment of the present invention. A contents reproduction apparatus 1 illustrated in FIG. 1 receives a contents reproduction request from a user and receives contents data via a communication terminal 2 connected thereto, and decodes the received contents data to output the decoded contents data to an output device such as a loudspeaker 3. The contents reproduction apparatus 1 is constructed of: a streaming control unit 11 (a buffer-size setting unit and a control unit) that controls input and output of the contents data; a contents buffer 12 (contents-data accumulation unit) that buffers the contents data; a contents reproduction unit 13 that decodes the contents data; an output switching unit 14 (output audio-data selection unit) that switches an audio output route according to an output switching signal; and a navigation function unit 15 (hereinafter, which may also be called "navigation function 15") that is a navigation unit that makes routing assistance to a destination and calculates an approximate required time based on map data held in a map database 151. The contents reproduction apparatus 1 is mounted on a movable object such as a vehicle, and is assumed to be in a utilization mode in which the contents data received by the communication terminal 2 are received and reproduced.

In the contents reproduction apparatus 1, a process of reproducing streaming contents is started upon reception of a contents reproduction request from the user by a predetermined method. Upon reception of the contents reproduction request, the streaming control unit 11 starts reception of streaming data (contents data) via the communication terminal 2 connected to the contents reproduction apparatus 1. The streaming control unit 11 accumulates the received contents data in the contents buffer 12. The streaming control unit 11 having received the contents reproduction request sets a buffer size (a target value of the data amount of contents to be accumulated in the contents buffer 12) in the contents buffer 12, based on vehicle information acquired from the navigation function unit 15. The streaming control unit 11 acquires information of a contents data amount indicating the data amount of the contents buffered in the contents buffer 12 from the contents buffer 12, and monitors the data amount of the contents buffered in the contents buffer 12. When detecting that the data amount of the contents accumulated in the contents buffer 12 has exceeded the set size, the streaming control unit 11 transmits a reproduction start signal to the contents reproduction unit 13 to start reproduction of the contents. The streaming control unit 11 also monitors an audio-output-state notification signal from the navigation function unit 15. Upon detection that audio output is started from the navigation function unit 15, the streaming control unit 11 transmits an output switching signal to the output switching unit 14 to switch the audio output route to the side of the navigation function unit 15. As a result, an audio signal from the navigation function unit 15 is outputted to the speaker 3. Upon reception of the reproduction start signal, the contents reproduction unit 13 sequentially reads the contents data from the contents buffer 12 and decodes the data to output an audio signal to the speaker 3 via the output switching unit 14.

Figure 2:
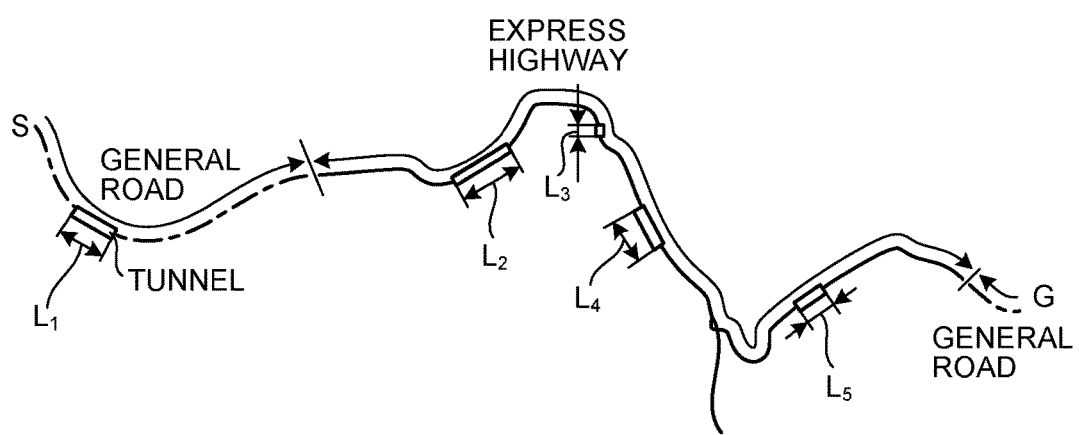
FIG. 2 is a diagram illustrating an example of a moving route of a movable object equipped with the contents reproduction apparatus.

A procedure to determine the buffer size to be set in the contents buffer 12 performed by the streaming control unit 11 is described next. As an example, description is given for a buffer-size determining procedure in a case where a vehicle (a movable object) mounted with the contents reproduction apparatus 1 runs on a running route illustrated in FIG. 2. In FIG. 2, a one-dot chain line denotes a general road, a solid line denotes an express highway, S denotes a current position, G denotes a destination position, and $L_1$ to $L_5$ denote tunnel lengths, respectively. Information of the running route illustrated in FIG. 2 is managed by the navigation function unit 15 as the map database 151, and the streaming control unit 11 is configured to be able to acquire the information of the running route.

Figure 3:
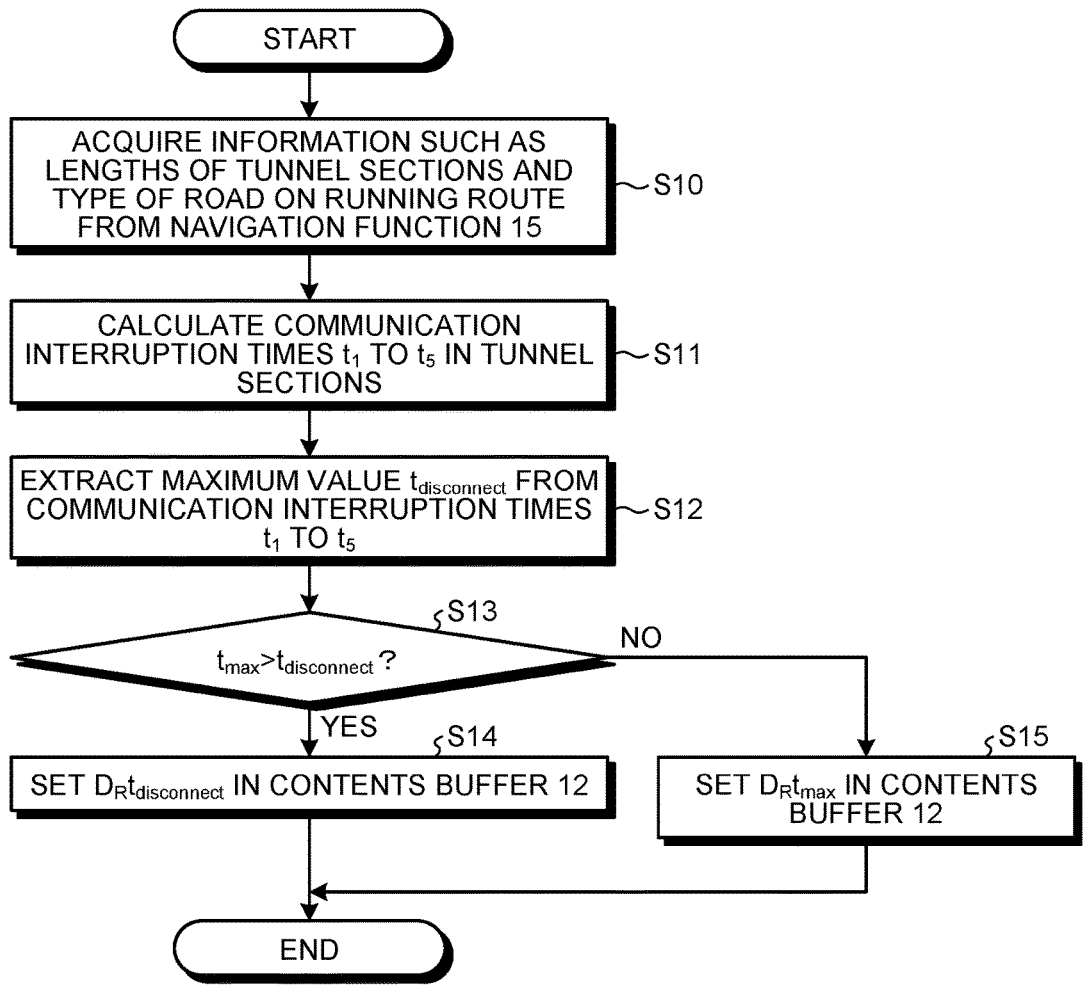
FIG. 3 is a flowchart illustrating a procedure of determining a buffer size performed by the contents reproduction apparatus.

FIG. 3 is a flowchart illustrating a buffer-size determining procedure according to the present embodiment. The streaming control unit 11 first acquires information such as the lengths ($L_1$ to $L_5$) of tunnel sections on a running route (for example, a guided route to a destination) set by the navigation function unit 15, and the type of a road (corresponding to either the general road or the express highway), as vehicle information from the navigation function unit 15 (navigation function 15) (Step S10). Next, the streaming control unit 11 divides the tunnel lengths ($L_1$ to $L_5$) by expected average running speeds ($v_1$ to $v_5$) in the respective sections to thereby calculate communication interruption times ($t_1$ to $t_5$) in the respective tunnel sections (Step S11). Upon completion of calculation of the communication interruption times $t_1$ to $t_5$, the streaming control unit 11 then extracts the longest communication interruption time from among the communication interruption times ($t_1$ to $t_5$) in the tunnel sections, as $t_{disconnect}$ (Step S12). Next, the streaming control unit 11 compares the maximum value $t_{disconnect}$ of the communication interruption time extracted at Step S12 with an upper limit $t_{max}$ that can be set in the contents buffer 12 (Step S13). When the maximum value $t_{disconnect}$ is smaller than the upper limit $t_{max}$ (YES at Step S13), the streaming control unit 11 sets a value obtained by multiplying the maximum value $t_{disconnect}$ by a data rate $D_R$ of the contents, in the contents buffer 12 (Step S14). When the maximum value $t_{disconnect}$ is equal to or larger than the upper limit $t_{max}$ (NO at Step S13), the streaming control unit 11 sets a value obtained by multiplying the upper limit $t_{max}$ by the data rate $D_R$ of the contents, in the contents buffer 12 (Step S15).

In the buffer-size determining procedure described above with reference to FIGS. 2 and 3, the tunnels are used for the communication interruption sections. However, when a section where radio waves cannot reach, such as a place behind a mountain, is known, the communication interruption time is calculated by dividing the length of the communication interruption section by the average running speed as with the case of the tunnels. As the average running speeds ($v_1$ to $v_5$) in the communication interruption sections, actual average running speeds on the general road and the express highway, which have been acquired from the navigation function unit 15, are used, for example. If the average running speeds cannot be acquired, values specified beforehand according to the road types, such as 30 km/h for the general road and 80 km/h for the express highway are used. These are just examples, and a speed at a time point when the buffer-size determining procedure is started, an average running speed in a past certain period from the time point when the buffer-size determining procedure is started, or the like may be used as an expected average running speed. The average running speed corresponds to the moving speed of the movable object. The upper limit $t_{max}$ that can be set in the contents buffer 12 is assumed as, for example, 12 seconds. The upper limit $t_{max}$ is a time during which reproduction of the streaming contents can be continued from when reception of the contents data no longer can be implemented during reproduction of the streaming contents (a time until reproduction of the streaming contents is interrupted from when reception of the contents data no longer can be implemented).

The streaming control unit 11 checks whether an average running speed has been changed at a predetermined timing based on the information of the average running speed acquired from the navigation function unit 15. When detecting that the average running speed has been changed, the streaming control unit 11 recalculates the buffer size in accordance with the flowchart shown in FIG. 3, and sets the calculated buffer size in the contents buffer 12.

A buffer-size changing procedure when an average running speed has been changed is described with reference to FIGS. 4 and 5. For the sake of simplifying the descriptions, it is assumed in the present description that the amount of contents data to be received by the streaming control unit 11 and the amount of data read by the contents reproduction unit 13 from the contents buffer 12 per unit time are equal to each other. Furthermore, "the case when an average running speed has been changed" is assumed to be a case where a variation of the average running speed exceeds a specified value. For example, when the variation exceeds 10 km/h, the streaming control unit 11 determines that the average running speed has been changed". Alternatively, the streaming control unit 11 may determine that the average running speed has been changed" when the average running speed is changed by 10%. The numerical values are only examples, and the present invention is not limited by these values.

Figure 4:
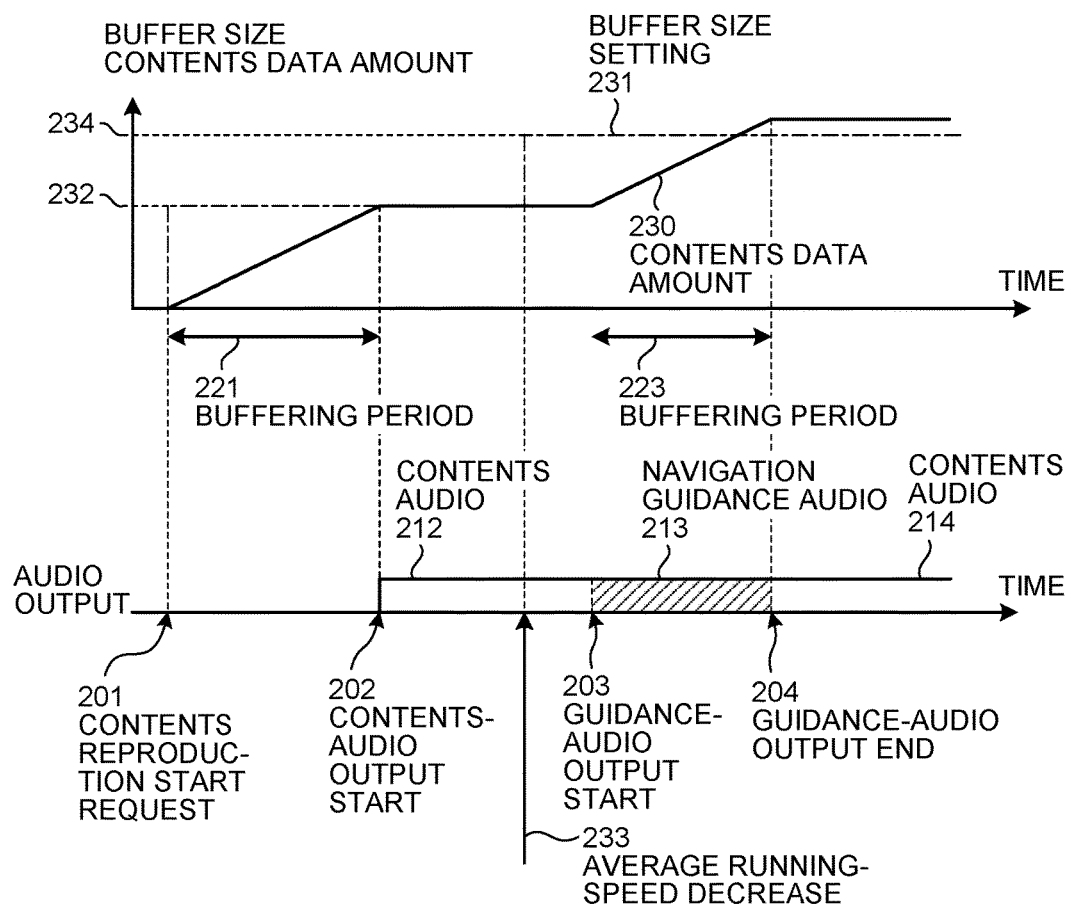
FIG. 4 is a chart illustrating an example of a relation among a buffer size set in a contents buffer, a data amount of accumulated contents and an audio output state.

FIG. 4 is a chart illustrating an example of a relation among the buffer size set in the contents buffer 12 during running, the data amount of accumulated contents, and an audio output state.

Upon reception of a contents reproduction request 201, the streaming control unit 11 sets a buffer size 232 in the contents buffer 12 in accordance with the flowchart illustrated in FIG. 3. As illustrated by a solid line in FIG. 4, it is assumed that no contents data are accumulated in the contents buffer 12 at a time point when the contents reproduction request 201 is received. When setting of the buffer size 232 is completed, the streaming control unit 11 performs buffering until a data amount 230 of contents accumulated in the contents buffer 12 exceeds the set value (the buffer size 232) (a buffering period 221). When detecting that the data amount of contents accumulated in the contents buffer 12 has exceeded the buffer size 232, the streaming control unit 11 transmits a reproduction start signal to the contents reproduction unit 13, and the contents reproduction unit 13 starts output of contents audio 212 (contents-audio output start 202). Thereafter, when detecting a decrease of the average running speed based on the average running speed information acquired from the navigation function unit 15 (average running-speed decrease 233), the streaming control unit 11 calculates a buffer size 234 to be newly set in accordance with the flowchart illustrated in FIG. 3, and sets the buffer size 234 in the contents buffer 12 (buffer size setting 231). At the time of updating the buffer size, when the data amount of contents accumulated in the contents buffer 12 is less than the currently-set buffer size, the streaming control unit 11 starts buffering after waiting for the timing of start of audio output by the navigation function unit 15 (guidance-audio output start 203, a buffering period 223). That is, when detecting the guidance-audio output start 203 of the navigation function unit 15, the streaming control unit 11 transmits an output switching signal to the output switching unit 14 to instruct to switch the audio output to the side of the navigation function unit 15, and transmits a reproduction stop signal to the contents reproduction unit 13 to instruct to stop the audio output of the contents. The streaming control unit 11 continues accumulation of the contents data in the contents buffer 12 also while the navigation function unit 15 is outputting navigation guidance audio 213, thereby increasing the contents data amount 230 (the buffering period 223). When detecting output end 204 of the guidance audio of the navigation function unit 15, the streaming control unit 11 transmits an output switching signal to the output switching unit 14 to instruct to switch the audio output to the side of the contents reproduction unit 13, and transmits a reproduction start signal to the contents reproduction unit 13 to instruct to start output of contents audio 214.

FIG. 4 gives illustration for an example in which the contents data amount 230 at a time point when the output end 204 of the guidance audio of the navigation function unit 15 is detected has reached the buffer size 234. However, even if the contents data amount 230 at the time point when the output end 204 of the guidance audio of the navigation function unit 15 is detected has not reached the buffer size 234, similar audio output control is executed. That is, the streaming control unit 11 transmits an output switching signal to the output switching unit 14 to instruct to switch the audio output to the side of the contents reproduction unit 13, and transmits a reproduction start signal to the contents reproduction unit 13 to instruct to start output of the contents audio 214. In this case, contents reproduction is supposed to be performed in a state where the contents data amount 230 is less than the buffer size 234. However, in the next section where the audio output by the navigation function unit 15 is performed or sections subsequent thereto, the contents reproduction (audio output) is stopped and the contents data amount 230 increases, so that the contents data amount 230 will become equal to or more than the buffer size 234 afterward.

Furthermore, when the audio output by the navigation function unit 15 is performed in a state where the contents data amount 230 is equal to or more than the buffer size 234, buffering (accumulation of contents data in the contents buffer 12) may be stopped, or may be continued until the accumulated data amount in the contents buffer 12 reaches an upper limit.

Figure 5:
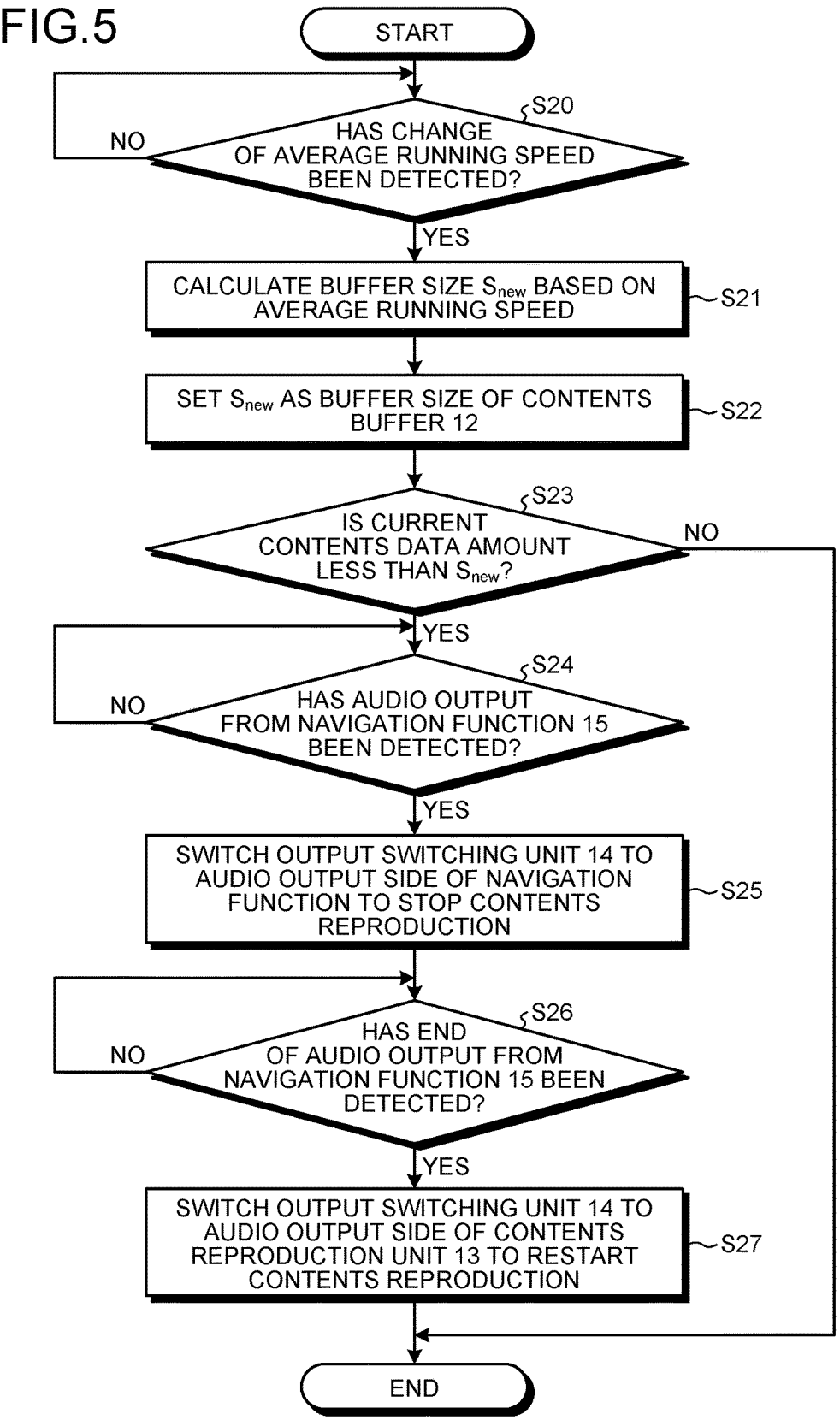
FIG. 5 is a flowchart illustrating a buffer-size changing procedure and an audio-output control procedure.

FIG. 5 is a flowchart illustrating the buffer-size changing procedure and an audio-output control procedure performed by the streaming control unit 11 at the time when the average running speed has been changed.

The streaming control unit 11 monitors whether the average running speed has been changed, based on the information (average running speed information) acquired from the navigation function unit 15 (Step S20). When detecting a change (YES at Step S20), the streaming control unit 11 starts the buffer-size changing procedure. In the buffer-size changing procedure, the streaming control unit 11 calculates a buffer size $S_{new}$ from the average running speed (Step S21), and sets the buffer size $S_{new}$ in the contents buffer 12 (Step S22). At these Steps S21 and S22, the buffer size $S_{new}$ is calculated and set by a procedure in accordance with the flowchart illustrated in FIG. 3. That is, the possible communication interruption time is calculated based on the length of a section where communication is interrupted due to a tunnel or the like and the average running speed, and the buffer size $S_{new}$ is calculated based on the calculated communication interruption time. Then, the calculated buffer size $S_{new}$ is reset in the contents buffer 12.

Next, the streaming control unit 11 compares the data amount of contents accumulated in the contents buffer 12 with the set buffer size $S_{new}$ (Step S23). When determining at Step S23 that the data amount of contents accumulated in the contents buffer 12 is equal to or more than the buffer size $S_{new}$ (NO at Step S23), the streaming control unit 11 ends the procedure. On the other hand, when determining at Step S23 that the data amount of contents accumulated in the contents buffer 12 is less than the set buffer size $S_{new}$ (YES at Step S23), the streaming control unit 11 performs audio output control at Step S24 and subsequent steps. At Step S24, the streaming control unit 11 monitors an audio-output start notification from the navigation function unit 15, and waits for start of audio output from the navigation function unit 15 (NO at Step S24). At Step S24, when detecting the audio output notification from the navigation function unit 15 (YES at Step S24), the streaming control unit 11 transmits an output switching signal to the output switching unit 14 to instruct to switch the output to the side of audio output of the navigation function unit 15, and transmits a reproduction stop signal to the contents reproduction unit 13 to instruct to stop the contents reproduction process (Step S25). At Step S26, the streaming control unit 11 waits for end of audio output from the navigation function unit 15. At Step S26, when detecting an end notification of audio output from the navigation function unit 15 (YES at Step S26), the streaming control unit 11 transmits an output switching signal to the output switching unit 14 to instruct to switch the output to the side of audio output of the contents reproduction unit 13, and transmits a reproduction start signal to the contents reproduction unit 13 to instruct to restart contents reproduction (Step S27).

The buffer-size changing procedure in a case where a change of the average running speed is detected has been described above. However, when the running route (the guided route to the destination) is changed, it is determined whether or not setting change of the buffer size is required, and when it is determined that the setting change is required, the buffer size is changed (reset). For example, when the longest communication interruption section (for example, a tunnel section) on the running route before changed and the longest communication interruption section on the running route after changed are subjected to change, it is determined that the setting change of the buffer size is required. When the longest communication interruption section on the running route has been passed, the buffer size may be reset based on the length of the longest communication interruption section on the remaining running route.

In this manner, when the contents are to be reproduced, the contents reproduction apparatus according to the present embodiment sets an initial value of the buffer size (a target value of the accumulated contents data amount in the contents buffer) based on the state of the scheduled running route of the movable object such as a vehicle (presence or absence of a tunnel, a length of a section where communication for reception of contents data is interrupted, such as a tunnel section, and the like) and the average running speed, and starts reproduction of the contents at a time point when the accumulation amount of the contents data reaches the buffer size. This prevents discontinuity of contents reproduction in a section where the contents data cannot be received. In addition, when the average running speed has changed, setting of the buffer size is changed, so that discontinuity of contents reproduction can be reliably prevented. Further, when a decrease of the average running speed is detected, the buffering process of the contents (the process to increase the accumulation amount of the contents data) is performed after waiting for audio output from the navigation function unit 15 (see FIG. 4). Accordingly, output interruption of the contents audio caused by the buffering process can be prevented from being recognized by the user.

Second Embodiment

A contents reproduction apparatus configured to include a streaming control device according to a second embodiment is described below. In the buffer-size changing procedure (FIGS. 4 and 5) according to the first embodiment described above, buffering of the contents data is performed after waiting for the start of audio output from the navigation function unit 15 (Steps S24 and S25 in FIG. 5). In contrast thereto, the contents reproduction apparatus according to the present embodiment basically has a configuration of the first embodiment described above, but is different therefrom in that this embodiment has a buffer-size changing procedure and a detecting unit that detects audio output from a hands-free function unit. Matters overlapped with the contents reproduction apparatus (FIG. 1) and the buffer-size changing procedure (FIG. 5) described in the first embodiment are denoted by the same reference signs in the corresponding drawings (FIGS. 6 and 7) and descriptions thereof will be omitted.

Figure 6:
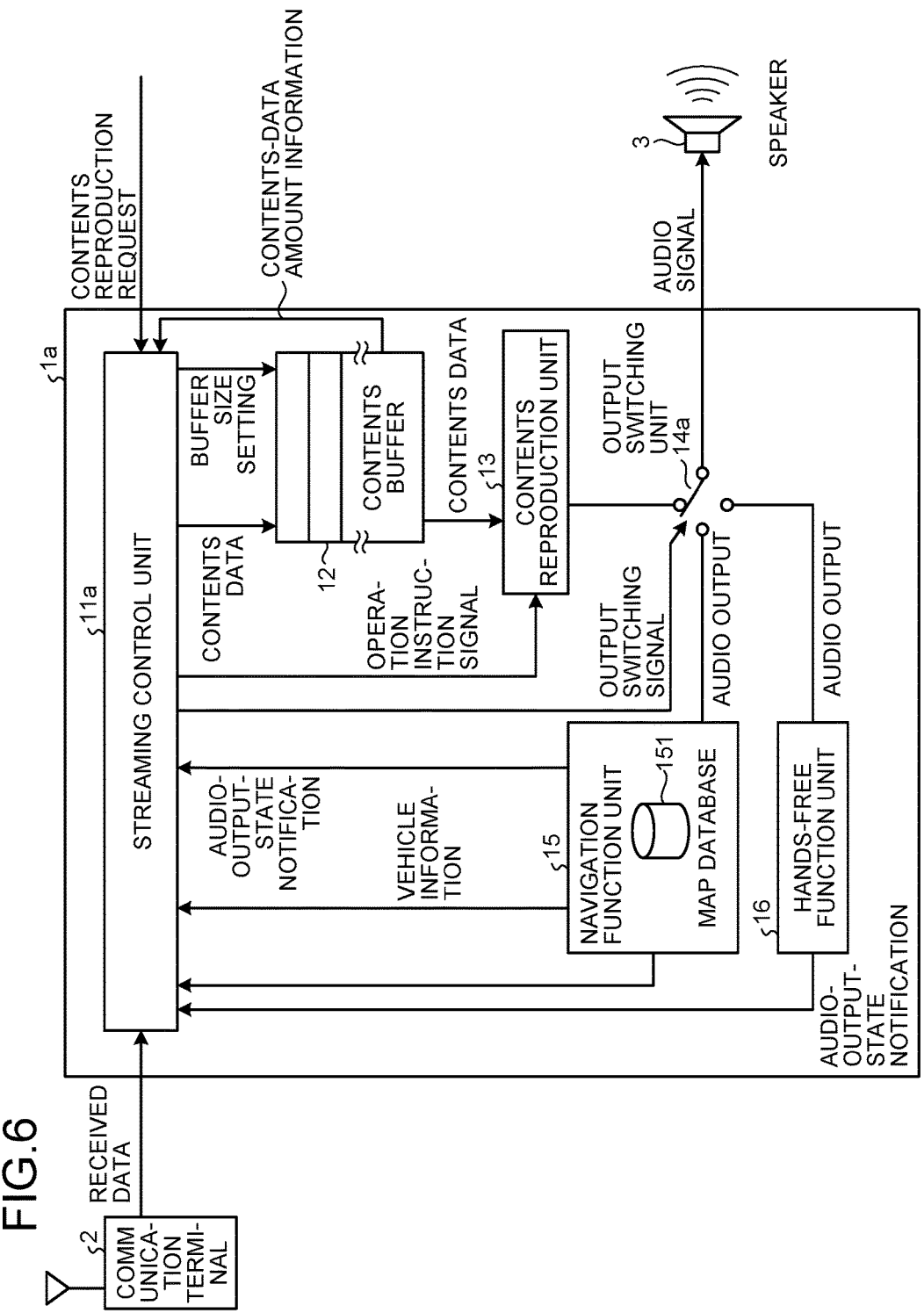
FIG. 6 is a diagram illustrating a configuration example of a contents reproduction apparatus according to a second embodiment.

FIG. 6 is a diagram illustrating a configuration example of the contents reproduction apparatus according to the second embodiment. Similarly to the contents reproduction apparatus 1 described in the first embodiment, a contents reproduction apparatus 1a illustrated in FIG. 6 receives a contents reproduction request from the user, receives the contents data via the communication terminal 2 connected thereto, decodes the received contents data, and outputs the decoded results to the output device such as the speaker 3.

As illustrated in FIG. 6, the contents reproduction apparatus 1a has a configuration in which the streaming control unit 11 and the output switching unit 14 in the contents reproduction apparatus 1 (see FIG. 1) of the first embodiment are replaced by a streaming control unit 11a and an output switching unit 14a, and a hands-free function unit 16 is added thereto. The streaming control unit 11a controls input and output of the contents data. The output switching unit 14a switches the audio output route according to an output switching signal from the streaming control unit 11a. In the contents reproduction apparatus 1 according to the first embodiment described above, at the time of audio output from the navigation function unit 15, the streaming control unit 11 controls the output switching unit 14 to switch the audio output route to the audio output side of the navigation function unit 15. In the contents reproduction apparatus 1a according to the present embodiment, the streaming control unit 11a controls the output switching unit 14a to switch the audio output route to a side of audio output from the hands-free function unit 16 also at the time of audio output from the hands-free function unit 16, in addition to at the time of audio output from the navigation function unit 15.

Figure 7:
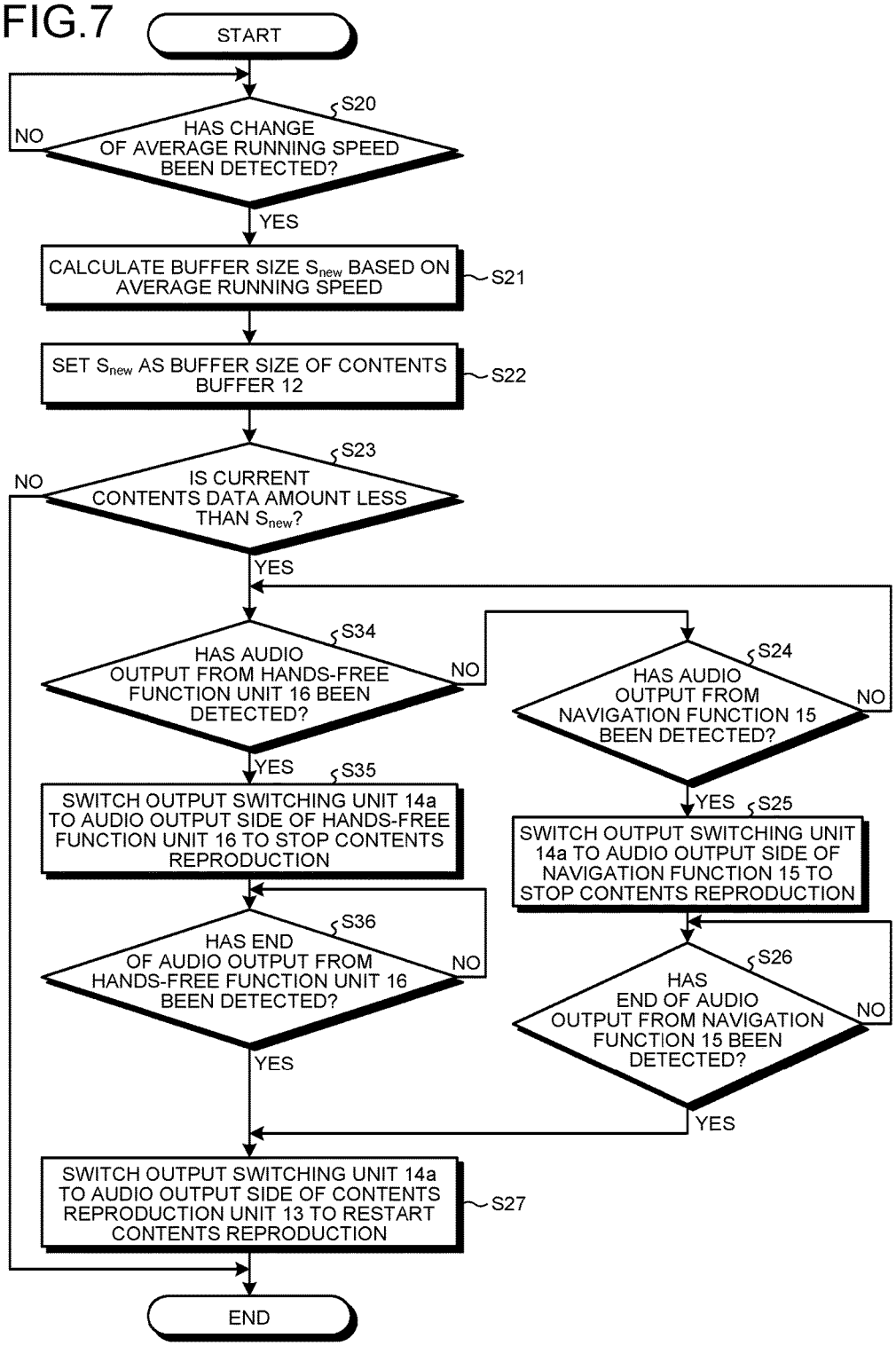
FIG. 7 is a flowchart illustrating a buffer-size changing procedure and an audio-output control procedure in the contents reproduction apparatus according to the second embodiment.

FIG. 7 is a flowchart showing a buffer-size changing procedure and an audio-output control procedure in the contents reproduction apparatus 1a of the second embodiment.

In the contents reproduction apparatus 1 according to the first embodiment, as described with reference to FIG. 5, when it is determined at Step S23 that the buffer size $S_{new}$ to be newly set in the contents buffer 12 is less than the current contents data amount, the audio-output detection procedure (Step S24) for detecting audio output from the navigation function unit 15 is executed. In contrast thereto, in the contents reproduction apparatus 1a according to the present embodiment, a procedure of detecting audio output from the hands-free function unit 16 (Step S34) is first performed. At Step S34, when start of audio output from the hands-free function unit 16 is detected (YES at Step S34), the streaming control unit 11a transmits an output switching signal to the output switching unit 14a to instruct to switch the output to the audio output side of the hands-free function unit 16, and transmits a reproduction stop signal to the contents reproduction unit 13 to instruct to stop the contents reproduction process (Step S35). When start of audio output from the hands-free function unit 16 is not detected (NO at Step S34), the streaming control unit 11a performs the processes from Step S24 to S26 described in the first embodiment. A configuration may be made such that Step S24 is performed first in the case where the determination result at Step S23 is YES, and Step S34 is performed when start of audio output from the navigation function 15 is not detected (NO at Step S24).

After the process at Step S35 is completed, the streaming control unit 11a waits for completion of audio output from the hands-free function unit 16 (Step S36). When detecting completion of audio output from the hands-free function unit 16 (YES at Step S36), the streaming control unit 11a transmits an output switching signal to the output switching unit 14a to instruct to switch the output to the audio output side of the contents reproduction unit 13, and transmits a reproduction start signal to the contents reproduction unit 13 to instruct to restart contents reproduction (Step S27).

In this manner, the contents reproduction apparatus according to the present embodiment further includes the hands-free function unit 16, wherein when a decrease of the average running speed is detected, the buffering process of the contents (the process to increase the accumulation amount of the contents data) is performed after waiting for start of audio output from the navigation function unit 15 or start of audio output from the hands-free function unit 16. Accordingly, as with the contents reproduction apparatus according to the first embodiment, output interruption of the contents audio associated with the buffering process can be prevented from being recognized by the user. Further, the number of opportunities of performing buffering can be increased, as compared with the contents reproduction apparatus according to the first embodiment.

Third Embodiment

A contents reproduction apparatus configured to include a streaming control device according to a third embodiment is described below. In the contents reproduction apparatus 1 according to the first embodiment (see FIG. 1) described above, during reproduction of the streaming contents, the contents reproduction unit 13 sequentially reads the contents data from the contents buffer 12. Therefore, when the data amount of contents received per unit time by the streaming control unit 11 is less than the amount of data read per unit time by the contents reproduction unit 13 from the contents buffer 12, the data amount of contents accumulated in the contents buffer 12 decreases with passage of time. Also when the vehicle runs in the communication interruption section such as a tunnel, the data amount of contents accumulated in the contents buffer 12 decreases with passage of time. If the data amount of contents accumulated in the contents buffer 12 becomes zero, audio output from the contents reproduction unit 13 stops. Therefore, in the present embodiment, when a state where the data amount of contents accumulated in the contents buffer 12 has become low is detected, buffering is actively performed. By doing so, the data amount of contents accumulated in the contents buffer 12 is prevented from becoming zero and causing stoppage of audio output. The present embodiment has basically the configuration and procedures according to the first embodiment, but is different from the first embodiment in that the navigation function unit 15 has a function of performing audio output in response to a guidance-audio output request and in that a procedure of actively performing buffering actively when the data amount of contents accumulated in the contents buffer 12 has become low is added.

Figure 8:
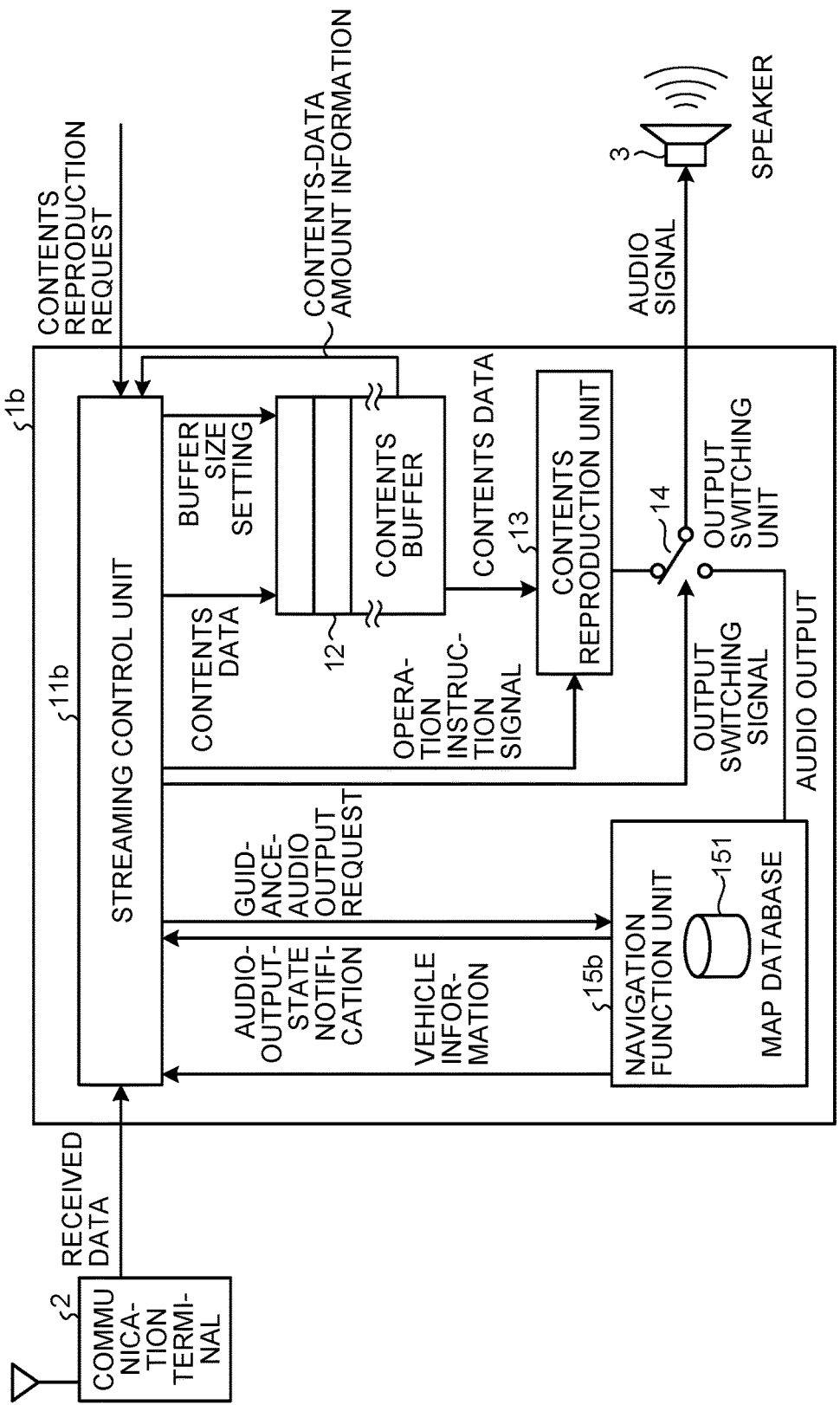
FIG. 8 is a diagram illustrating a configuration example of a contents reproduction apparatus according to a third embodiment.

FIG. 8 is a diagram illustrating a configuration example of a contents reproduction apparatus according to the third embodiment. As illustrated in FIG. 8, a contents reproduction apparatus 1b has a configuration in which the streaming control unit 11 and the navigation function unit 15 of the contents reproduction apparatus 1 (see FIG. 1) according to the first embodiment are replaced by a streaming control unit 11b and a navigation function unit 15b. The streaming control unit 11b controls input and output of contents data. The navigation function unit 15b reproduces guidance audio in response to the guidance-audio output request from the streaming control unit 11b.

During reproduction of the streaming contents, the streaming control unit 11b according to the present embodiment monitors the data amount of the contents data accumulated in the contents buffer 12. When detecting that the data amount has fallen below a minimum contents data amount $S_{Low}$, the streaming control unit 11b transmits a guidance-audio output request to the navigation function unit 15b. When receiving the guidance-audio output request from the streaming control unit 11b, the navigation function unit 15b checks whether or not an elapsed time since the last audio output is equal to or more than a minimum audio output interval $T_{Navi}$. When the elapsed time is equal to or more than $T_{Navi}$, the navigation function unit 15b performs guidance audio output. Examples of guidance audio output include information related to a traveling direction at a next intersection and a continuous drive time. When detecting that the guidance audio is outputted from the navigation function unit 15b, the streaming control unit 11b transmits a reproduction stop signal to the contents reproduction unit 13 to instruct to stop reproduction. This stops readout of the contents data from the contents buffer 12, and the data amount of the contents data accumulated in the contents buffer 12 increases.

Figure 9:
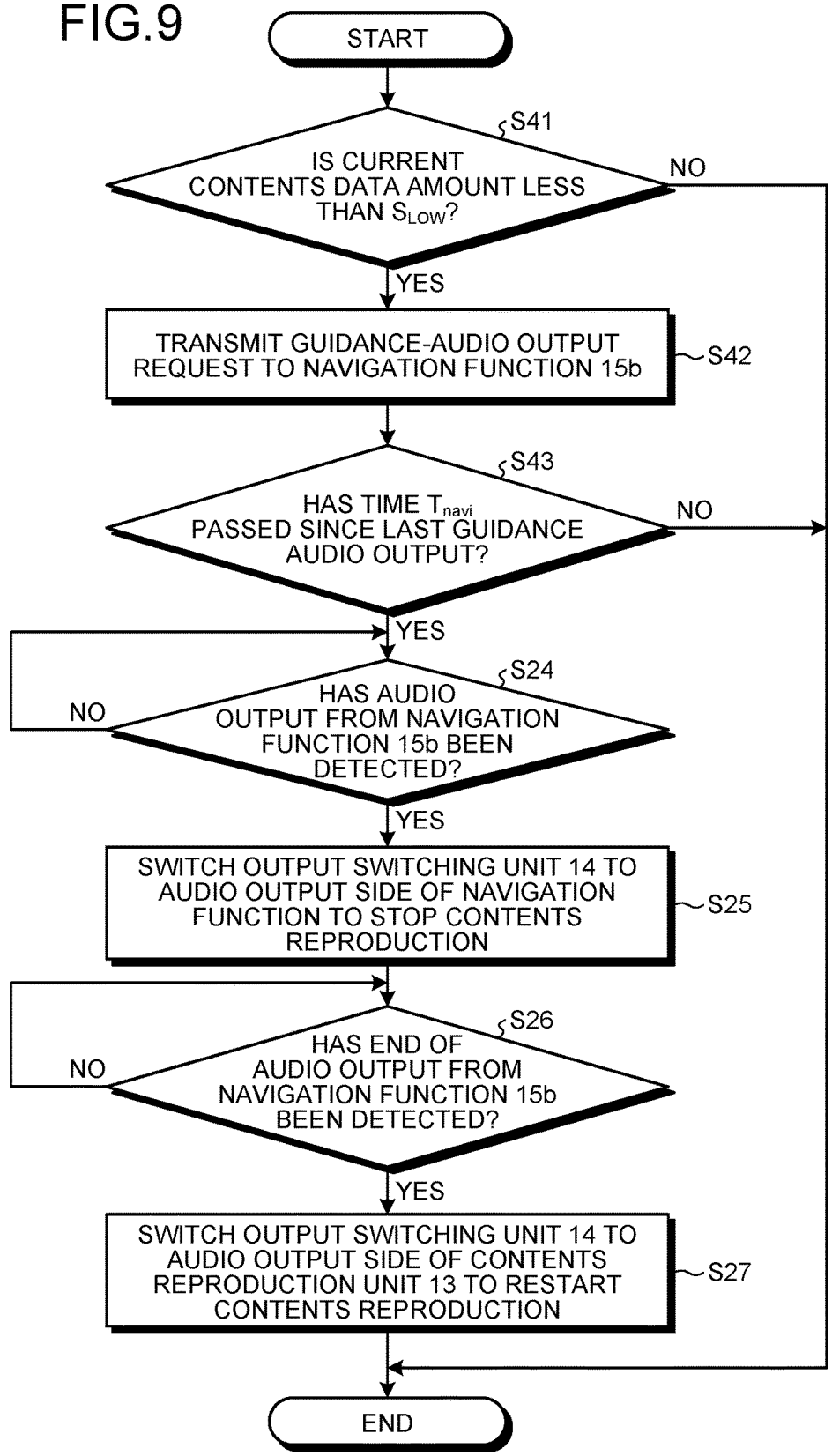
FIG. 9 is a flowchart illustrating a procedure of buffering actively performed by the contents reproduction apparatus according to the third embodiment.

FIG. 9 is a flowchart illustrating a procedure of buffering actively performed by the contents reproduction apparatus 1b according to the third embodiment. The contents reproduction apparatus 1b repeatedly performs an operation in accordance with the procedure illustrated in FIG. 9 at predetermined timings.

In the contents reproduction apparatus 1b, the streaming control unit 11b first compares the data amount of the contents (hereinafter, "contents data amount") accumulated in the contents buffer 12 with the minimum contents data amount $S_{Low}$ (Step S41). When the contents data amount is less than the minimum contents data amount $S_{Low}$ (YES at Step S41), the streaming control unit 11b transmits a guidance-audio output request to the navigation function unit 15b (Step S42). Upon reception of the guidance-audio output request, the navigation function unit 15b compares an elapsed time since the last guidance audio output with the minimum audio output interval $T_{Navi}$ (Step S43). As a result of the comparison, when the elapsed time is less than $T_{Navi}$ (NO at Step S43), the procedure is completed. On the other hand, when the elapsed time is equal to or more than $T_{Navi}$ (YES at Step S43), the navigation function unit 15b outputs predetermined guidance audio according to the guidance-audio output request. In this case, the streaming control unit 11b is supposed to perform processes at Step S24, and Steps S25 to S27 subsequent thereto. The processes of Steps S24 to S27 are the same as those of Step S24 to S27 (see FIG. 5) described in the first embodiment. A reason of limiting the output of the guidance audio by the navigation function unit 15b to the case where the elapsed time is equal to or more than $T_{Navi}$ is because, for example, the same guidance audio is to be prevented from being repeatedly outputted with a short interval.

Also when it is determined at Step S41 that the contents data amount is equal to or larger than the minimum contents data amount $S_{Low}$ (NO at Step S41), the procedure is completed.

The minimum contents data amount $S_{Low}$ may be a fixed value, or a value according to the buffer size calculated based on the average running speed or the like.

In this manner, in the contents reproduction apparatus according to the present embodiment, when the data amount of the contents data accumulated in the contents buffer 12 has fallen below the specified value (the minimum contents data amount $S_{Low}$), output of the guidance audio by the navigation function unit 15b is performed, and buffering (the process to stop reproduction of the contents to increase the accumulated amount of data in the contents buffer 12) is performed. Accordingly, as with the contents reproduction apparatus according to the first embodiment, output interruption of the contents audio associated with the buffering process can be prevented from being recognized by the user. Furthermore, the number of opportunities of performing the buffering can be increased. Further, stop of audio output from the contents reproduction unit 13 can be avoided.

In the contents reproduction apparatus according to the first embodiment, the accumulation amount of the contents data is monitored. However, the contents reproduction apparatus according to the second embodiment may have such a configuration that the accumulation amount of the contents data is monitored and, when a decrease of the accumulation amount is detected, audio output from the navigation function unit is started to perform buffering.

In the above embodiments, description has been made for the configuration examples in which the contents reproduction apparatus includes the navigation function unit and the hands-free function unit. However, these units may be replaced by a navigation function device and a hands-free function device so as to realize a configuration having the devices provided outside of the contents reproduction apparatus. Further, the contents reproduction apparatus may have a function of a communication terminal for receiving wirelessly transmitted contents data.

Figure 10:
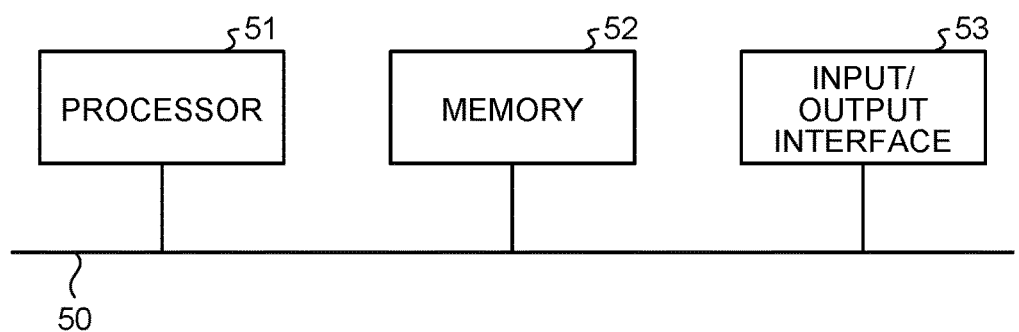
FIG. 10 is a diagram illustrating a configuration example of hardware for realizing the contents reproduction apparatus.

Some of the constituent elements of the contents reproduction apparatus described in the first to third embodiments can be realized by hardware having a configuration illustrated in FIG. 10.

Some of the constituent elements of the contents reproduction apparatuses can be realized by a processor 51, a memory 52 constituted by a RAM (Random Access Memory), a ROM (Read Only Memory) or the like, and an input/output interface 53. The processor 51, the memory 52 and the input/output interface 53 are connected to a bus 50, to communicate data, control information and the like with each other via the bus 50.

The streaming control units 11, 11a and 11b of the contents reproduction apparatuses are realized by storing a program for the streaming control unit in the memory 52 and executing the program by the processor 51. The contents buffer 12 is realized by the memory 52. The contents reproduction unit 13 is realized by storing a program for the contents reproduction unit in the memory 52 and executing the program by the processor 51. The navigation function units 15 and 15b are realized by storing a program for the navigation function unit in the memory 52 and executing the program by the processor 51. The map database 151 is realized using the memory 52. The input/output interface 53 is used at the time of receiving the contents data from the communication terminal 2.

INDUSTRIAL APPLICABILITY

As described above, the contents reproduction apparatus according to the present invention is useful as the contents reproduction apparatus that is carried in a movable object such as a vehicle and reproduces contents data (streaming data) transmitted via a wireless line.

REFERENCE SIGNS LIST 1, 1a, 1b contents reproduction apparatus, 2 communication terminal, 3 speaker, 11, 11a, 11b streaming control unit, 12 contents buffer, 13 contents reproduction unit, 14, 14a output switching unit, 15, 15b navigation function unit, 16 hands-free function unit, 50 bus, 51 processor, 52 memory, 53 input/output interface, 151 map database.

The invention claimed is:

1. A contents reproduction apparatus that is mounted on a movable object and reproduces content data streamed by wireless transmission, the contents reproduction apparatus comprising:
a content buffer that accumulates the content data;
a content decoder that reproduces the content data stored in the content buffer;
a route navigator that determines a route from a current position to a destination of the movable object;
an output audio-data selector that switches between outputting first audio data from the content decoder to an output speaker and outputting second audio data from the route navigator to the output speaker; and a controller configured to set or adjust a buffer size of the content buffer based on information about the route determined by the route navigator and a moving speed of the movable object, wherein when the output audio-data selector is switched to output the second audio data from the route navigator to the output speaker, if an amount of content data accumulated in the content buffer is less than the buffer size set by the controller, the controller stops the content decoder from reproducing the content data stored in the content buffer while the second audio data is being output to the output speaker.

2. The contents reproduction apparatus according to claim 1, wherein the controller resets the buffer size when a variation of the moving speed of the movable object exceeds a specified value.

3. The contents reproduction apparatus according to claim 1, wherein the information about the route determined by the route navigator is information of a length of a section where discontinuity of wireless transmission occurs while the movable object is moving on the route.

4. The contents reproduction apparatus according to claim 3, wherein when the determined route information indicates there are a plurality of sections where discontinuity of wireless transmission occurs, the controller calculates the buffer size based on a length of a longest section from among the plurality of sections and the moving speed of the movable object.

5. The contents reproduction apparatus according to claim 3, wherein the section is a tunnel section.

6. The contents reproduction apparatus according to claim 1, wherein when receiving an instruction to start reproduction of the content data, the content decoder starts a reproduction operation at a time point when an amount of data accumulated in the content buffer has exceeded the buffer size.

7. The contents reproduction apparatus according to claim 1, further comprising:

a hands-free processor having an audio input/output function, wherein the output audio-data selector switches between outputting the first audio data to the output speaker, outputting the second audio data to the output speak and outputting third audio data from the hands-free processor to the output speaker, and when the amount of data accumulated in the content buffer is less than the buffer size, the controller stops the content decoder from reproducing the content data stored in the content buffer while the second audio data is being outputted to the output speaker and while the third audio data is being outputted to the output speaker.

8. The contents reproduction apparatus according to claim 1, wherein the controller requests the route navigator to start providing audio data when an amount of data accumulated in the content buffer becomes less than the buffer size.

9. The contents reproduction apparatus according to claim 8, wherein upon reception of a request to start output of audio data from the controller, the route navigator starts output of audio data according to the request if a predefined period of time has passed since last output of audio data.

* * * * *